L. CAMPBELL.
Cotton Gin.
No. 12,894. Patented May 22, 1855.
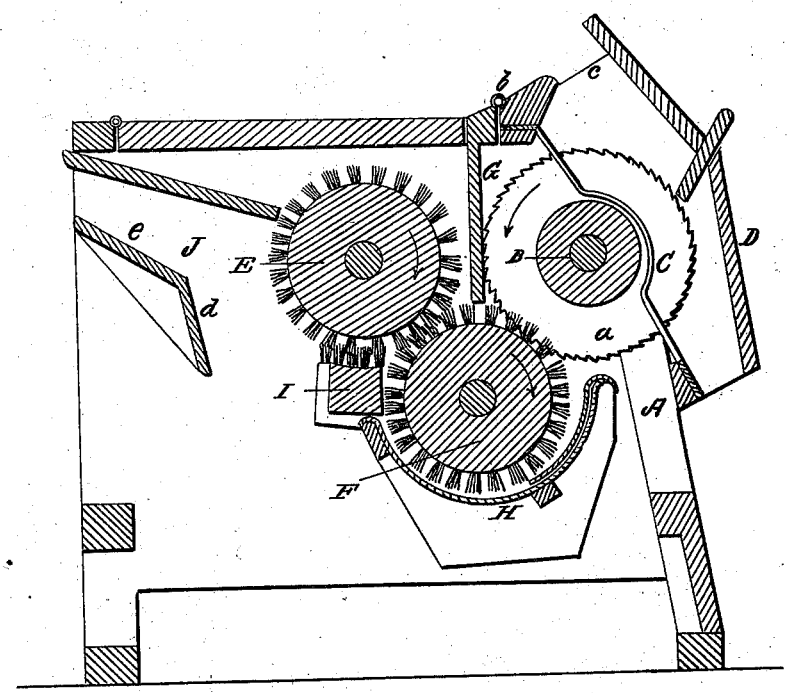

UNITED STATES PATENT OFFICE.

LEONARD CAMPBELL, OF COLUMBUS, MISSISSIPPI, ASSIGNOR TO L. CAMPBELL AND THOS. W. BROWN.

IMPROVEMENT IN COTTON-GINS.

Specification forming part of Letters Patent No. 12,894, dated May 22, 1855.

*To all whom it may concern:*

Be it known that I, LEONARD CAMPBELL, of Columbus, in the county of Lowndes and State of Mississippi, have invented certain new and useful Improvements in Cotton-Gins; and I do hereby declare that the following is a full, clear, and exact description of the same, reference being had to the annexed drawing, making a part of this specification, said drawing being a longitudinal vertical section of my improvement.

First, my invention consists in the combination of two rotating brush-cylinders and a stationary concave brush-bar arranged as will be hereinafter shown and described. Second, my invention consists in the employment or use of a mote-board constructed in a peculiar manner, as will be presently shown.

To enable others skilled in the art to fully understand and construct my invention, I will proceed to describe it.

A represents a frame, constructed in any proper manner to support the working parts of the machine.

B represents a transverse shaft at the front end of the machine, the journals of said shaft working in suitable bearings on the frame A. On this shaft B are placed a series of saws, $a$, arranged in the usual manner.

C represents a series of ribs, the upper and lower ends of which are secured in a box, D, the upper end of which is secured to the upper part of the frame A by hinges $b$. The ribs are technically termed the "breast," and the saws rotate between the ribs in the usual manner.

E is a brush-cylinder placed transversely in the frame A, and about on a horizontal line with the saw-shaft B, a short space being allowed between the brushes and the saws.

F is a brush-cylinder, also placed transversely in the frame A, and below the saws $a$ and the brush-cylinder E. The brush-cylinder F overlaps the saws $a$, and its brushes are in contact with those on the cylinder E, as shown in the drawing. Between the saws $a$ and the brush-cylinder E there is placed a vertical board, G. The upper end of this board is attached to the framing A, and the lower end reaches down to the edges of the brushes of the cylinder F, but does not quite touch them.

H is a concave screen placed underneath the brush-cylinder F, as shown in the drawing, and I is a brush-bar placed transversely in the frame A. The upper surface of this bar is concave, and the brushes are attached thereto, and are in contact with the brushes on the cylinder E. The frame A is provided with side pieces and also a top piece, the bottom and back end being open. The front end is covered by the box D, an opening, $c$, being left at its top for the insertion of the cotton.

J represents a mote-board placed within the frame A, at its back end. This mote-board is formed of two planes, $d\ e$, one of which, $d$, is slightly inclined, forming a small angle with a vertical line. The other plane, $e$, is inclined at an angle of about forty-five degrees. The cotton is placed in the box D, through the opening $c$, and motion is given the saw-shaft B and brush-cylinders E F in any proper manner, the saws and cylinders rotating in the direction indicated by the arrows. The brush-cylinder F picks the cotton from the saws $a$, and the cotton is carried around on said cylinder and taken off by the brush-cylinder E. The concave screen H prevents the cotton from falling from the cylinder F, while the air, dust, dirt, and trash are permitted to pass through it. The cotton, perfectly ginned and cleansed, is discharged from between the brush-cylinder E and concave brush-bar I. The board G prevents the air or blast, caused by the rotation of the brush-cylinder E, from blowing the ginned cotton back upon the saws $a$, and the mote-board J allows the motes to pass under the plane $e$, while the plane $d$ prevents particles of cotton, which are specifically lighter and consequently have less momentum, from passing under the plane $e$.

The above invention has been practically tested and operates well. It renders perfect the gin formerly patented by me.

What I claim as new, and desire to secure by Letters Patent, is—

1. The combination, of the two brush-cylinders E F and brush-bar I, arranged substantially as herein shown and described.

2. The employment or use of the mote-board J, when constructed of two planes, $d\ e$, placed at such angles or in such a relative position to each other as herein shown and described.

LEONARD CAMPBELL.

Witnesses:
F. L. DOWSING,
S. G. LETCHER.